United States Patent [19]
Price

[11] Patent Number: 5,151,217
[45] Date of Patent: Sep. 29, 1992

[54] MICRO-EMULSIONS

[75] Inventor: Anthony Price, Runcorn, England

[73] Assignee: Imperial Chemical Industries PLC, London, England

[21] Appl. No.: 673,310

[22] Filed: Mar. 22, 1991

[30] Foreign Application Priority Data

Mar. 26, 1990 [GB] United Kingdom ............ 9006726

[51] Int. Cl.⁵ .................................. B01J 13/00
[52] U.S. Cl. ............................. 252/312; 252/357; 524/801; 514/964; 514/965
[58] Field of Search .............. 252/312, 357; 524/801

[56] References Cited

U.S. PATENT DOCUMENTS

| | | | |
|---|---|---|---|
| 3,673,142 | 6/1972 | Saunders et al. | 260/29.6 RW |
| 4,064,091 | 12/1977 | Samour et al. | 260/29.6 |
| 4,617,343 | 10/1986 | Walker et al. | 524/817 |
| 4,857,585 | 8/1989 | Leising | 524/815 |
| 4,873,827 | 10/1989 | Kanluen et al. | 526/214 |
| 4,938,877 | 7/1990 | Bock et al. | 210/723 |
| 4,956,399 | 9/1990 | Kozakiewicz et al. | 523/223 |
| 4,968,435 | 11/1990 | Neff et al. | 210/734 |
| 4,999,398 | 3/1991 | Gravier et al. | 524/837 |
| 5,041,503 | 8/1991 | Dauplaise et al. | 525/383 |
| 5,063,092 | 11/1991 | Lenti et al. | 427/393 |

FOREIGN PATENT DOCUMENTS

| | | |
|---|---|---|
| 0107145 | 5/1984 | European Pat. Off. . |
| 0292325 | 11/1988 | European Pat. Off. . |
| 3047688 | 7/1982 | Fed. Rep. of Germany . |
| 2540123 | 8/1984 | France . |

OTHER PUBLICATIONS

Hauge, E. et al. "Novel Polymeric Materials from Microemulsions" J. of Polymer Science: Part C: Polymer Letters (1988) 26:429–432.

Anderson, D. M. et al. "Polymerization of Lyotropic Liquid Crystals" Polymer Association Structures Microemulsions and Liquid Crystals (ACS Symposium Series (1989)) Chapter 13.

Langevin, D. "Microemulsions" Accounts of Chemical Research (1988) 21:256–260.

Primary Examiner—Richard D. Lovering
Assistant Examiner—N. Bhat
Attorney, Agent, or Firm—Cushman, Darby & Cushman

[57] ABSTRACT

Bicontinuous microemulsions wherein both the oil and the surfactant are addition-polymerizable and which on polymerization yield transparent solids wherein both the solid and the aqueous liquid phases are continuous. Such solids may be used in separation processes.

11 Claims, 1 Drawing Sheet

MICRO-EMULSIONS

The present invention relates to microemulsions, particularly bicontinuous microemulsions, solid products prepared therefrom and to the preparation of such microemulsions and solid state products.

It is known that a combination of both a water-immiscible organic liquid and an aqueous liquid can be mixed in the presence of certain one or more surfactants such that an optically clear, optically isotropic liquid is formed. Such a liquid is known in the art as a "microemulsion". A microemulsion can be distinguished from conventional emulsions by its optical clarity, low viscosity, small domain size and thermodynamic stability.

Three types of microemulsions are known, namely oil-in-water, water-in-oil and bicontinuous microemulsions. In bicontinuous microemulsions, the water-immiscible organic liquid forms a first continuous phase, the aqueous liquid forms a second continuous phase and the phases are intermingled such that the properties hereinbefore ascribed to a microemulsion are observed.

It is known that microemulsions can be formed from certain water/water-immiscible organic liquid/surfactant combinations. For example, certain anionic, cationic and non-ionic surfactants have been used with certain combinations as described by D. Langevin in Accounts of Chemical Research, July 1988.

It has been reported that the polymerisation of certain bicontinuous microemulsions comprising a non-polymerisable surfactant produced a bicontinuous opaque solid wherein the pore sizes were of micron size as a result of phase growth (E. Haque & S. Qutubuddin, Journal of Polymer Science: Part C: Polymer Letters, 1988, Vol 26, 429–432). Furthermore it, has been suggested that rearrangement of the micro-structure of microemulsion during polymerisation seems inevitable because of their low viscosity and the timescale of rearrangement, i.e. microseconds, due to thermal disruption (D. Anderson & P. Ström in Polymer Association Structures; Microemulsions and Liquid Crystals, Edt M El-Nokaly, 384 ACS Symposium Series, Chapter 13).

We have now prepared bicontinuous microemulsions wherein both the water-immiscible organic material and the surfactant contain addition-polymerisable groups and found surprisingly that such microemulsions can be converted into solid products which comprise a continuous solid phase formed from the polymerised water-immiscible organic material and a continuous liquid phase comprising the aqueous liquid.

According to a first aspect of the present invention there is provided a bicontinuous microemulsion which comprises an aqueous phase, one or more addition-polymerisable water-immiscible organic materials (hereinafter referred to for convenience as "polymerisable oil") and one or more surfactants, characterised in that at least one of the one or more surfactants is addition-polymerisable.

In bicontinuous microemulsions according to the present invention the aqueous phase is typically water or a solution of an appropriate solute therein. The solute may be a liquid or preferably a solid or more preferably an electrolyte, e.g. a halide.

Where the aqueous phase is a solution the appropriate concentration of the solute therein for a particular application may be found by the skilled man by simple experiment.

As examples of suitable polymerisable oils may be mentioned inter alia unsaturated hydrocarbons, e.g. styrene; halo-compounds, e.g. vinyl chloride; or preferably alkyl esters of (alk)acrylates, e.g. n-butyl methacrylate, unsaturated urethanes, e.g. Modar ((RTM) ex ICI); unsaturated polyesters; or "aromatic/aldehyde oligomers" with addition-polymerisable unsaturated end groups as are more fully described in our European Patent Specification No 0,112,650, e.g. derived from diphenyl oxide, formaldehyde and methacrylic acid, i.e.

$$\text{methacrylate}-CH_2(Ar-CH_2)_n-\text{methacrylate} \tag{I}$$

wherein Ar represents PhOPh where Ph represents phenyl.

It is often preferred that the polymerisable oil comprises more than one addition-polymerisable water-immiscible organic compound.

As examples of suitable addition-polymerisable surfactants may be mentioned inter alia non-ionic, anionic or preferably cationic surfactants, e.g. quaternary ammonium compounds, or tertiary amine salts, e.g.

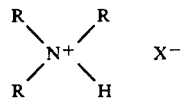

Where the addition-polymerisable surfactant is a quaternary ammonium compound the cation is preferably present as the salt of an inorganic acid, more preferably a hydrohalic acid.

The addition-polymerisable group on the addition-polymerisable surfactant is preferably an (alk)acrylate, more preferably a methacrylate but we do not exclude the possibility that it may be derived from an olefinic group, e.g. an alkene or styrene.

The addition-polymerisable group on the addition-polymerisable surfactant may be present adjacent the cation, where the surfactant is cationic, although it is often preferred that it is distant therefrom.

Preferably the addition-polymerisable surfactant has the General Formula II

wherein
$X^-$ is a suitable counter-ion;
$R^1$ and $R^2$, which may be the same or different, are $C_{1-5}$ carbon groups;
$R^3$ and $R^4$, which may be the same or different, are $C_{1-30}$ carbon groups;
with the proviso that at least one of $R^1$, $R^2$, $R^3$ and $R^4$ bears an addition-polymerisable group.

$X^-$ is preferably an inorganic anion, particularly preferably a halide and more particularly preferably bromide.

Both $R^1$ and $R^2$ are preferably methyl and $R^3$ is preferably a chain of $C_3-C_{10}$ carbon atoms.

It is often preferred that $R^4$ is a chain of about eleven carbon atoms bearing an addition-polymerisable group, e.g. a methacrylate.

The addition-polymerisable surfactant will be chosen in the light of inter alia the nature, particularly hydrophobicity, of the polymerisable oil. For example, as the polarity of the oil is decreased the hydrophobicity of the addition-polymerisable surfactant can often be increased. We have found that the following combinations may be used

| Surfactant | Polymerisable Oil |
|---|---|
| $\begin{array}{c}C_4H_9\phantom{xxx}CH_3\\ \diagdown\phantom{x}\diagup\\ N^+\phantom{xx}Br^-\\ \diagup\phantom{x}\diagdown\\ CH_2=C(CH_3)CO_2(CH_2)_{11}\phantom{xx}CH_3\end{array}$ | t-butyl methacrylate |
| $\begin{array}{c}C_8H_{17}\phantom{xxx}CH_3\\ \diagdown\phantom{x}\diagup\\ N^+\phantom{xx}Br^-\\ \diagup\phantom{x}\diagdown\\ CH_2=C(CH_3)CO_2(CH_2)_{11}\phantom{xx}CH_3\end{array}$ | dodecyl methacrylate |
| $\begin{array}{c}C_4H_9\phantom{xxx}CH_3\\ \diagdown\phantom{x}\diagup\\ N^+\phantom{xx}Br^-\\ \diagup\phantom{x}\diagdown\\ CH_2=C(CH_3)CO_2(CH_2)_{11}\phantom{xx}CH_3\end{array}$ | styrene |
| $\begin{array}{c}C_6H_{13}\phantom{xxx}CH_3\\ \diagdown\phantom{x}\diagup\\ N^+\phantom{xx}Br^-\\ \diagup\phantom{x}\diagdown\\ CH_2=C(CH_3)CO_2(CH_2)_{11}\phantom{xx}CH_3\end{array}$ | t-Bu-styrene |

In the micro-emulsion of the present invention the concentrations of the components are typically as follows, expressed as % w/w:

| | |
|---|---|
| aqueous phase | 5-75 |
| polymerisable oil | 10-30 |
| surfactant | 25-70 | wherein the combined % w/w's are substantially 100%.

Whereas we do not exclude the possibility that the polymerisable oil and the addition-polymerisable surfactant may separately homopolymerise in the method according to the present invention as hereinafter defined, it is preferred that they are copolymerisable.

We do not exclude the possibility that a further surfactant which is non-polymerisable, e.g. $(C_{12}H_{25})_2N^+(CH_3)_2Br^-$, may be present, however this is not preferred. Where a non-polymerisable surfactant is present typically a major portion (i.e. more than 50% w/w) of the surfactant is polymerisable.

The skilled man will be able to determine appropriate ratios for the components in the microemulsion by simple experiment. For example, where the microemulsion comprises butyl methacrylate and water and the surfactant is

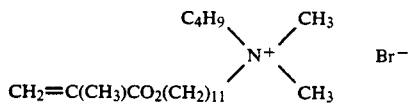

suitable ratios are illustrated in FIG. 1 of the drawing appended hereto.

According to a second aspect of the present invention there is provided a solid composition comprising a continuous solid phase and a continuous aqueous liquid phase characterised in that the solid composition appears transparent to the naked eye.

The continuous solid phase in the solid composition according to the second aspect of the present invention may be rigid, e.g. a cross-linked polymer or a polymer below its Tg; or soft or rubbery, e.g. a polymer above its Tg. By choice of inter alia a suitable polymerisable oil and concentration thereof the skilled man, by simple experimentation, will be able to prepare a solid composition of desired rigidity/flexibility.

The continuity of the continuous liquid phase in the solid composition of the present invention may be demonstrated by determining the electrical conductivity of the solid composition.

The continuity of the continuous solid phase in the solid composition of the present invention may be demonstrated by methods known in the art.

It will be appreciated that water tends to evaporate from the solid composition according to the second aspect of the present invention. Where it is desired to retain the water in the aqueous liquid phase of the solid composition, the solid composition is subjected to a suitable treatment, e.g. kept in an aqueous environment or coated with a suitable impermeable coating, e.g. a polymer.

Where it is desired to remove the water from the aqueous liquid phase of the solid composition according to the present invention such removal may be accelerated by the application of a vacuum thereto.

Solid compositions according to the present invention may be useful in separation processes, e.g. Reverse Osmosis and purification of proteins, and in processes requiring controlled permeability, e.g. sustained release of drugs or biocides.

According to a further aspect of the present invention there is provided a solid material prepared by removing the aqueous liquid phase from the solid composition according to the second aspect of the present invention.

The microemulsion according to the present invention may be polymerised by methods known in the addition-polymerisation art, e.g. by reaction with a suitable free radical initiator. For example, it may be reacted with azodiisobutyronitrile (ADIB), or preferably a suitable peroxide, e.g. a room-temperature curing peroxide, or a photo-initiator. We have found that the temperature at which polymerisation is carried out tends to affect the structure of the solid composition. It is often preferred that polymerisation is carried out at about room temperature, e.g. with a photo-initiator, to retain the correct structure.

According to a yet further aspect of the present invention there is provided a method for preparing a solid composition according to the second aspect of the present invention which method comprises treating a microemulsion according to the first aspect of the present invention with an addition-polymerisation catalyst under polymerisation conditions therefor.

It will be appreciated that in the preparation of solid compositions according to the second aspect of the present invention by the method according to the yet further aspect of the present invention (a) the reaction conditions will be chosen such that the configuration of the microemulsion is retained during the method and (b) a polymerisable oil will be chosen which (i) is capable of producing a polymerised product which has a Tg above room temperature or (ii) is cross-linkable with a suitable monomer in the reaction mixture used in the method to afford a rigid product.

Where a photo-initiator composition is used in the method according to the present invention it generates free-radicals on exposure to a source of electro-magnetic radiation which act as an initiator for the polymerisation of both the addition-polymerisable oil and the one or more addition-polymerisable surfactants and preferably for the copolymerisation thereof.

The photo-initiator composition, where it is used, may consist of a single compound or may comprise at least two components. Typically, it comprises any of the known photo-initiator systems which are used to initiate addition-polymerisation of polymerisable olefinically-unsaturated monomers. As examples of such compositions may be mentioned inter alia (a) mixtures of Michler's ketone and benzil or preferably benzophenone, typically in a weight ratio of about 1:4; (b) the coumarin-based photo-initiator systems described in U.S. Pat. No. 4,289,844 (c) combinations of hexaarylbisimidazoles and leuco dyes, (d) cyclohexadiene-leuco dye systems described in U.S. Pat. No. 4,241,869 or (e) systems based on dimethoxyphenylacetophenone (benzil dimethyl ketal) and/or diethoxyacetophenone or (f) preferably mixtures of amines and ketones as disclosed in our UK Patent Specifications Nos 1,408,265 and 1,494,903, e.g. camphorquinone, flurenone or morpholine and N,N-dimethylaminoethyl methacrylate, typically in a weight ratio of about 1:1; or (g) mixtures of (i) a light-sensitive initiator system, e.g. an α-diketone, a reducing agent capable of reducing the ketone when the latter is in an excited state, e.g. an organic amine, and (ii) a peroxide, as disclosed in our European Patent Specifications Nos 0,059,649, and 0,090,493, the disclosures in which are incorporated herein by way of reference; e.g. a photo-initiator composition comprising camphorquinone, N,N'-dimethylaminoethyl methacrylate and tert-butyl perbenzoate, preferably in the weight ratio about 1:1:1.

The ketone may, for example, be present in the microemulsion in the concentration 0.1% to 2% by weight of the addition-polymerisable material therein although concentrations outside this range may be used if desired. Preferably the α-diketone is present in a concentration of 0.1% to 1% by weight of the addition-polymerisable materials in the microemulsion.

The ketones should be soluble in the polymerisable material, and the above concentrations refer to solution concentrations.

The reducing agent is preferably present in the microemulsion in concentrations in the range 0.01% to 2% by weight of the addition-polymerisable material although concentrations outside this range may be used if desired.

The organic peroxides, where present in the microemulsion according to the present invention, include those having the formula $R^5-O-O-R^5$ in which the groups $R^5$, which may be the same or different, are hydrogen, alkyl, aryl, or acyl groups, no more than one of the groups $R^5$ being hydrogen. The term acyl means groups having the formula $R^6-CO-$ in which $R^6$ is an alkyl, aryl, alkoxy or aryloxy group. The terms alkyl and aryl include substituted alkyl and aryl.

Examples of organic peroxides suitable for use in the method of the present invention include diacetyl peroxide, dibenzoyl peroxide, ditertiary butyl peroxide, dilauroyl peroxide, tertiary-butyl perbenzoate, ditertiary-butyl-cyclohexyl perdicarbonate.

The organic peroxide may be, for example, present in the bicontinuous microemulsion in the range 0.1% to 20%, preferably 0.5% to 5%, by weight of the polymerisable material in the microemulsion although concentrations outside this range may be used if desired.

The reactivity of a peroxide is often measured in terms of its half-life temperature, i.e. within ten hours at that temperature half of the oxygen has been made available. The peroxides suitable for use in the method according to the present invention preferably have ten-hour half-life temperatures of less than 150° C., more preferably less than 110° C.

The present invention is further illustrated by reference to the accompanying drawings which show, by way of example only, three-phase diagrams for the concentrations of water, polymerisable oil and polymerisable surfactant for certain microemulsions.

Figure 1:
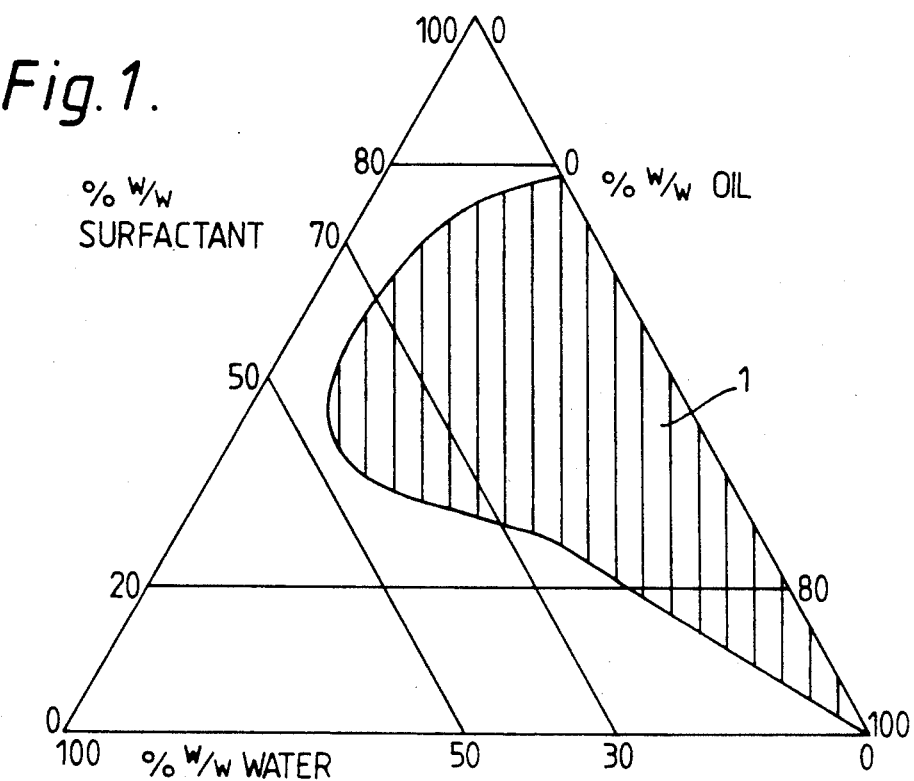
In FIG. 1, the polymerisable oil is butyl methacrylate and the surfactant is methacryloyloxundecyl, butyl, dimethylammonium bromide(Formula III). The hatched zone 1 of FIG. 1 indicates the range of concentrations over which we have obtained a microemulsion.
Figure 2:
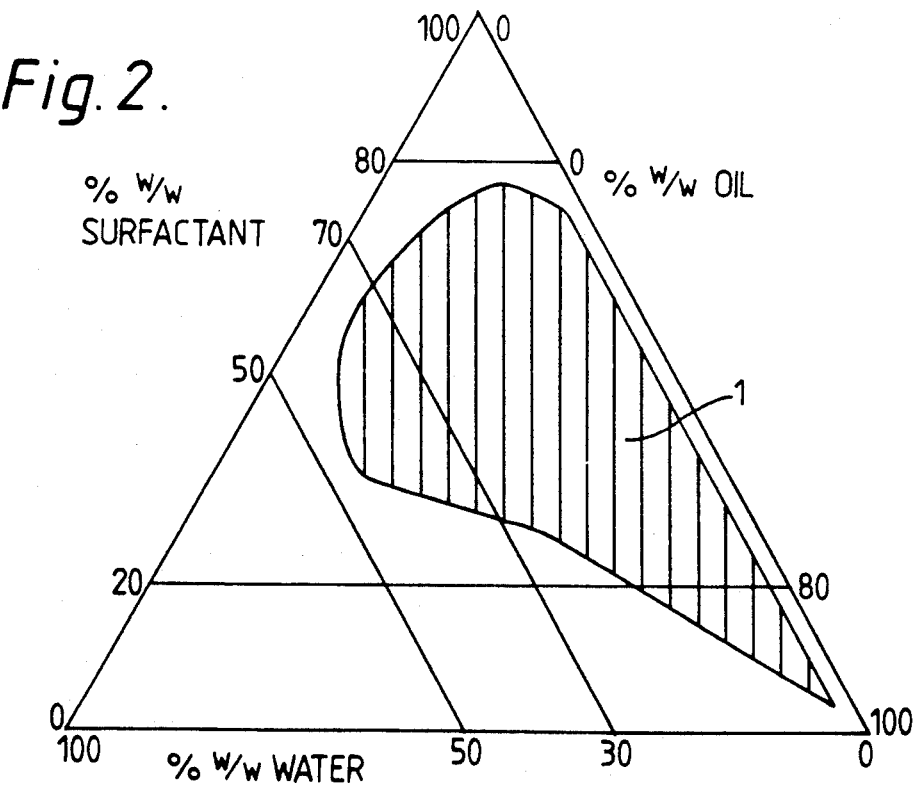
In FIG. 2, the polymerisable oil is t-butyl styrene and the surfactant is methacrylyloxyundecyl, hexyl, dimethyl ammonium bromide (Formula V). The hatched zone 1 of FIG. 2 indicates the range of concentration over which we have obtained a microemulsion.

It will be appreciated that the purity of the components of the microemulsion may affect the concentrations over which a microemulsion is obtained. By simple experiment, the skilled man will be able to determine appropriate concentrations.

The present invention is further illustrated by reference to the following Examples.

EXAMPLES 1-3

These Examples illustrate bicontinuous microemulsions and solid compositions according to the first and second aspects of the present invention respectively.

A bicontinuous microemulsion of doubly distilled water, distilled monomers (a first methacrylate and diethylene methacrylate in weight ratio 19:1), a copolymerisable surfactant,

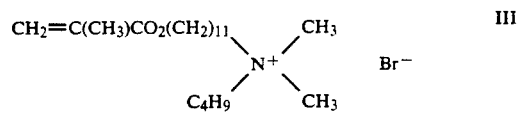

in Examples 1 and 2, and

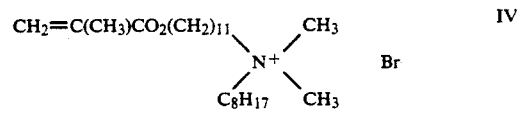

in Example 3, and a photocuring catalyst system of camphor quinone (0.75% w/w, on monomer) and dimethylaminoethyl methacrylate (0.75% w/w, on monomer) in a glass vial was exposed to electromagnetic radiation of 470 nm from a cold light source (Schott Model KL 1500) with emission of 20M Lux for 15 minutes at 20° C.

The products were electrically conducting (5 $LnK^{-1}$), optically clear, solid materials.

The compositions used in these Examples are shown in Table 1.

TABLE 1

| EXAMPLE NO | WATER % w/w | MONOMERS % w/w | FIRST METHA- CRYLATE | SUR- FACTANT % w/w |
|---|---|---|---|---|
| 1 | 20 | 40 | BM | 40 |
| 2 | 30 | 35 | EM | 35 |
| 3 | 10 | 45 | LM | 45 |

BM: n-butyl methacrylate
EM: ethyl methacrylate
LM: lauryl methacrylate

EXAMPLE 4

This Example illustrates a further bicontinuous microemulsion and solid composition according to the present invention.

A bicontinuous microemulsion of doubly distilled water (20% w/w), distilled monomers (40% w/w of t-butyl styrene and divinyl benzene in weight ratio of 39:1), copolymerisable surfactant $$CH_2=C(CH_3)CO_2(CH_2)_{11} \diagdown \diagup CH_3$$
$$N^+ \qquad Br^- (40\% \text{ w/w}) \qquad V$$
$$C_6H_{13} \diagup \diagdown CH_3$$

and catalyst α-azo-iso-butyronitrile (1% on monomer) in a glass vial were heated at 85° C. for 24 hours.

The product was an electrically conducting (5 $LnK^{-1}$), optically clear, solid material.

EXAMPLES 5–8

These Examples illustrate the use of solid compositions according to the second aspect of the present invention as membrane.

The procedure of Example 2 was repeated using the surfactant of Formula III and the components and ratios shown in Table 2.

TABLE 2

| EXAMPLE NO. | WATER % W/W | MONOMERS % W/W BUTYL METHA- CRYLATE | ETHYL METHA- CRYLATE | SUR- FACTANT % W/W |
|---|---|---|---|---|
| 5 | 15 | 5 | 38 | 42 |
| 6 | 20 | 4 | 36 | 40 |
| 7 | 30 | 3 | 32 | 35 |
| 8 | 35 | 3 | 29 | 32 |

Polymerisation was carried out between Melinex lined glass plate. Clear solid plaques (0.5 mm thick; 6 cm diameter) were obtained.

Each plaque was scoured using silicon carbide paper (Grade P600A) to afford a membrane of thickness 170 microns.

The permeability of each membrane was determined as follows. It was placed on a sintered support, subjected to a brine solution (2000 ppm, NaCl) at 900 psi at 25° C. and was found to have the flux and rejection rate shown in Table 3.

TABLE 3

| EXAMPLE NO | FLUX | REJECTION % |
|---|---|---|
| 5 | 0.0130 | 91.5 |
| 6 | 0.0164 | 87.4 |
| 7 | 0.0386 | 87.3 |
| 8 | 0.0512 | 87.1 |

I claim:

1. A bicontinuous microemulsion which comprises an aqueous phase, one or more addition-polymerisable water-immiscible organic materials and one or more addition-polymerisable surfactants.

2. A bicontinuous microemulsion as claimed in claim 1 wherein the addition-polymerisable water-immiscible organic material is an alkyl ester of an (alk)acrylate, an unsaturated urethane, an unsaturated polyester or an aromatic/aldehyde oligomer.

3. A bicontinuous microemulsion as claimed in claim 1 wherein the addition-polymerisable surfactant is cationic.

4. A bicontinuous microemulsion as claimed in claim 1 wherein the addition-polymerisable group borne by the addition-polymerisable surfactant is an (alk)acrylate.

5. A bicontinuous microemulsion as claimed in claim 3 wherein the addition-polymerisable surfactant has the general formula $$R^3 \diagdown \diagup R^1$$
$$N^+ \qquad X^-$$
$$R^4 \diagup \diagdown R^2$$

wherein
  $X^-$ is a suitable counter-ion;
  $R^1$ and $R^2$, which may be the same or different, are $C_{1-5}$ carbon groups;
  $R^3$ and $R^4$, which may be the same or different, are $C_{1-36}$ carbon groups;
  with the proviso that at least one of $R^1$, $R^2$, $R^3$ and $R^4$ bears an addition-polymerisable group.

6. A bicontinuous microemulsion as claimed in claim 3 or 5 wherein the counter-ion is an inorganic anion.

7. A bicontinuous microemulsion as claimed in claim 6 wherein the inorganic anion is a halide.

8. A bicontinuous microemulsion as claimed in claim 5 wherein both $R^1$ and $R^2$ represent methyl groups.

9. A bicontinuous microemulsion as claimed in claim 8 wherein $R^3$ represents a chain of between 3 and 10 carbon atoms.

10. A bicontinuous microemulsion as claimed in claim 9 wherein $R^4$ represents a chain of about eleven carbon atoms bearing an addition-polymerisable group.

11. A bicontinuous microemulsion as claimed in claim 1 wherein a combination of the water-immiscible addition-polymerisable organic compound and the one or more addition-polymerisable surfactants are chosen from the following combinations:

| Surfactant | Polymerisable Oil |
|---|---|
| $C_4H_9 \diagdown \diagup CH_3$ $N^+ \qquad Br^-$ $CH_2=C(CH_3)CO_2(CH_2)_{11} \diagup \diagdown CH_3$ | t-butyl methacrylate |

-continued

| Surfactant | Polymerisable Oil |
|---|---|
| $\text{CH}_2\text{=C(CH}_3\text{)CO}_2\text{(CH}_2\text{)}_{11}-\overset{\underset{|}{\text{CH}_3}}{\underset{\underset{|}{\text{CH}_3}}{\text{N}^+}}-\text{C}_8\text{H}_{17} \quad \text{Br}^-$ | dodecyl methacrylate |

-continued

| Surfactant | Polymerisable Oil |
|---|---|
| $\text{CH}_2\text{=C(CH}_3\text{)CO}_2\text{(CH}_2\text{)}_{11}-\overset{\underset{|}{\text{CH}_3}}{\underset{\underset{|}{\text{CH}_3}}{\text{N}^+}}-\text{C}_4\text{H}_9 \quad \text{Br}^-$ | styrene |
| $\text{CH}_2\text{=C(CH}_3\text{)CO}_2\text{(CH}_2\text{)}_{11}-\overset{\underset{|}{\text{CH}_3}}{\underset{\underset{|}{\text{CH}_3}}{\text{N}^+}}-\text{C}_6\text{H}_{13} \quad \text{Br}^-$ | t-Bu-styrene. |

* * * * *